(12) United States Patent
Kirkeby

(10) Patent No.: US 6,914,693 B1
(45) Date of Patent: Jul. 5, 2005

(54) METHOD, SYSTEM, AND PROGRAM FOR TRANSMITTING FACSIMILES IN A NETWORK ENVIRONMENT WHERE MULTIPLE FAX SERVERS USE A COMMON RENDERING MACHINE

(75) Inventor: Kevin Wayne Kirkeby, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,147

(22) Filed: Mar. 23, 2000

(51) Int. Cl.⁷ .......................... G06K 15/00; H04N 1/40; H04N 1/32
(52) U.S. Cl. ...................... 358/1.15; 358/462; 358/468; 358/407; 379/100.13
(58) Field of Search ................................ 358/400, 401, 358/404, 405, 407, 468, 462, 1.15; 379/100.01, 100.08, 100.09, 100.12, 100.13

(56) References Cited

U.S. PATENT DOCUMENTS

| | | | |
|---|---|---|---|
| 6,020,980 A | | 2/2000 | Freeman |
| 6,025,931 A | * | 2/2000 | Bloomfield .................. 358/402 |
| 6,157,945 A | | 12/2000 | Balma et al. |
| 6,185,184 B1 | | 2/2001 | Mattaway et al. |
| 6,278,532 B1 | * | 8/2001 | Heimendinger ............. 358/442 |
| 6,330,079 B1 | | 12/2001 | Dugan et al. |
| 6,405,244 B1 | | 6/2002 | Bando et al. |
| 6,411,685 B1 | | 6/2002 | O'Neal |
| 6,417,933 B1 | | 7/2002 | Szurkowski |
| 6,421,707 B1 | | 7/2002 | Miller et al. |
| 6,424,426 B1 | | 7/2002 | Henry |
| 6,549,612 B2 | | 4/2003 | Gifford et al. |
| 2002/0176117 A1 | * | 11/2002 | Randalli ..................... 358/407 |

OTHER PUBLICATIONS

U.S. Appl. No. 09/533,520, filed Mar. 23, 2000, entitled "Method, System, and Program for Using Application Programs in Multiple Computers to Render Attachments for a Fax Job".

U.S. Appl. No. 09/533,498, filed Mar. 23, 2000, entitled "Method, System, and Program for Transmitting Facsimiles in a Network Environment".

* cited by examiner

*Primary Examiner*—Jerome Grant, II
(74) *Attorney, Agent, or Firm*—Konrad Raynes & Victor, LLP

(57) ABSTRACT

Disclosed is a system, method, and program for processing a message in a network computing system including a facsimile transmission comprised of a recipient contact address and message content. The message content includes at least one of message text and attached files. Multiple facsimile transmissions are managed as fax jobs in multiple fax management systems. The fax management systems transfer the message content from the fax jobs to a rendering computer. The rendering computer launches at least one application program to convert the message content from the multiple fax jobs to images in a file format and transfers each converted message content in the file format to the fax management system that sent the message content to the rendering computing system. The fax management systems transfer the message content in the file format to one of multiple communication ports for transmittal to the recipient contact address.

21 Claims, 5 Drawing Sheets

METHOD, SYSTEM, AND PROGRAM FOR TRANSMITTING FACSIMILES IN A NETWORK ENVIRONMENT WHERE MULTIPLE FAX SERVERS USE A COMMON RENDERING MACHINE

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Using Application Programs in Multiple Computers to Render Attachments For a Fax Job," by Kevin W. Kirkeby, having Ser. No. 09/533,520; and "Method, System, And Program For Transmitting Facsimiles in a Network Environment," by Kevin W. Kirkeby, having Ser. No. 09/533,498.

BACKGROUND OF THE INVENTION

1. Field of the Invention

The present invention relates to a method, system, and program for managing fax jobs in a network computing system and, in particular, using one machine to render fax jobs for multiple fax servers that manage fax jobs in a network environment.

2. Description of the Related Art

In network computing systems, users at client computers may send and receive facsimiles through a shared system to centrally manage fax resources for network users. One prior art implementation of a network facsimile system uses one or more fax servers that are dedicated to receiving, rendering, transmitting, and otherwise managing facsimile jobs from network users. The dedicated fax servers have modem ports to directly transmit the fax message as well as perform all fax management related operations. One disadvantage of using server class machines as the fax server is the substantial cost of server machines. Another disadvantage is that such fax servers would be limited to rendering fax documents created in server based applications. However, network users most likely create fax documents with common application programs that are more likely to execute on personal computer oriented machines, such as word processors, graphics programs, spreadsheet programs, etc., that do not run efficiently or at all on the server machine. Thus, users could not use the fax server to transmit the type of documents they are most likely to have.

Another prior art network fax solution involves the use of a Windows NT server as a dedicated fax server that receives, renders, transmits and otherwise manages the facsimile message. The Windows NT fax server includes a modem port to transmit the facsimile as well as perform all fax management related operations. One disadvantage of this approach is that the Windows NT machine performs both fax rendering as well as fax transmission operations. Because both these operations are computationally intensive, in large network environments, many of these Windows NT machines must be provided to perform both rendering and fax transmission. A further disadvantage of this approach is that the network must incorporate a Windows NT system and then install the server software on the Windows NT dedicated fax server to integrate with the overall system. This installation of the server software with the Windows NT is often undesirable from an integration and compatibility standpoint.

Thus, there is a need in the art for a more cost effective approach for managing the facsimile transmission of documents in a network environment that avoids incompatibility and integration problems with the current network architecture.

SUMMARY OF THE PREFERRED EMBODIMENTS

To overcome the limitations in the prior art described above, preferred embodiments disclose a method, system, and program for processing a message in a network computing system including a facsimile transmission comprised of a recipient contact address, such as a phone number, e-mail address, etc., and message content. The message content includes at least one of message text and attached files. Multiple facsimile transmissions are managed as fax jobs in multiple fax management systems. The fax management systems transfer the message content from the fax jobs to a rendering computer. The rendering computer launches at least one application program to convert the message content from the multiple fax jobs to images in a file format and transfers each converted message content in the file format to the fax management system that sent the message content to the rendering computing system. The fax management systems transfer the message content in the file format to one of multiple communication ports for transmittal to the recipient contact address.

Preferred embodiments provide an improved technique for processing e-mail faxes with attachment files in a network environment by using a dedicated computer system to render and convert the attachment files to images in an image file format such as TIFF that are ready for facsimile transmission from multiple fax servers. With the preferred embodiments, the fax management operations are performed on the fax servers and the file conversion operations are performed on a separate, dedicated conversion computer, such as a personal computer class machine that is particularly suited for rendering and converting attachment files to the image format. In this way, the fax servers are freed of having to perform attachment file rendering and conversion operations which can consume substantial fax server resources. Instead, the rendering and conversion operations for multiple fax servers are performed by a different computing system, such as one or more personal computers, that are not only less expensive than the server class machines, but also are more efficient in rendering files in the personal computer application programs that are most typically used to create attachment files.

Further, because in prior art systems the same server handles both rendering and facsimile transmission, the available resources to perform rendering operations is substantially diverted to handling the facsimile transmission. Preferred embodiments improve this dilemma by having the dedicated conversion computer return the rendered fax job to the originating fax server to handle the facsimile transmission. Because, in preferred embodiments, each fax server has its own modem, fax jobs may be transmitted concurrently, thus reducing the facsimile transmission bottleneck.

By using the dedicated conversion computer and freeing fax server resources from having to perform conversion operations, the fax servers are capable of simultaneously managing more fax jobs and the dedicated conversion computer is capable of concurrently converting multiple attachment files from one or more fax jobs from multiple fax servers. Thus, the throughput and processing capacity of the overall system is improved in a cost effective manner that is less expensive than the current solution of adding additional fax servers or adding additional dedicated fax rendering Windows NT systems.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
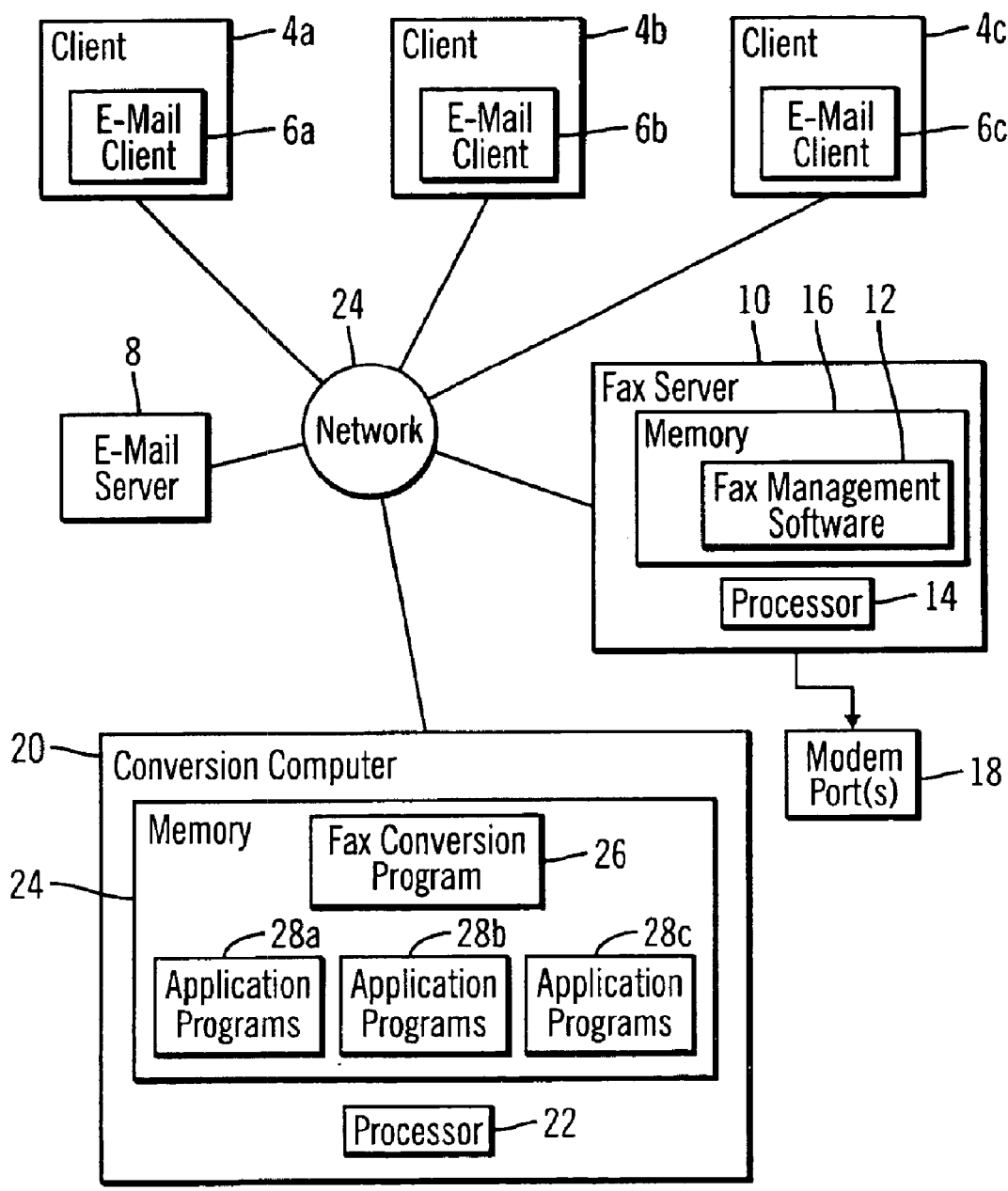
FIG. 1 is a block diagram illustrating a computing environment in which preferred embodiments of the present invention are implemented.

FIG. 1 illustrates a computing environment in which preferred embodiments are implemented. Client computers 4a, b, c, include e-mail client programs 6a, b, c, such as the Lotus Notes network client software. The client computers 4a, b, c could assemble e-mail messages which would be initially routed to an e-mail server 8, which may comprise any network server known in the art including server software for network messaging and routing e-mail messages from clients, such as the Lotus Domino server, Microsoft BackOffice Exchange Server, etc.** Those e-mails that are intended for facsimile transmission, referred to herein as "fax e-mails", are routed to a fax server 10 that includes fax management software 12. The fax server 10 is preferably a server class machine, such as the IBM AS/400. The fax server 10 includes one or more server class processors 14, memory 16, and server software (not shown), such as the Lotus Domino software. The processor 14 includes a central processing unit (CPU), which executes instructions to control the operations of the entire fax server 10. The memory 16 may comprise volatile memory and portions of non-volatile storage, where programs such as the fax management software 12 may be swapped between such volatile and non-volatile portions of memory 16. The fax server 10 fax management software 12 is capable of managing multiple facsimile transmissions transmitted for numerous network clients 4a, b, c. The fax server 10 would have access to one or more modem ports 18 capable of facsimile transmission.

The fax server 10 would transmit any attachments and message text in the fax e-mail message to a conversion computer 20. In preferred embodiments, the conversion computer 20 is a personal computer class machine having a personal computer class processor 22 and memory 24, which may comprise both volatile memory and non-volatile storage. Programs may be swapped between such volatile and non-volatile portions of memory 24. The processor 22 includes one or more central processing unit (CPU), which executes instructions to control the operations of the entire conversion computer 20. The conversion computer 20 further includes a fax conversion program 26. To convert attachments created using different software programs, e.g., word processors, spreadsheets, database, etc., the conversion computer 20 would include application programs 28a, b, c capable of opening and viewing the content of attachments from different application programs. The fax conversion program 26 would determine the application programs 28a, b, c needed to view attachments in the fax e-mail and then launch those determined application programs 28a, b, c to convert the attachments to a common format, such as the TIFF file format.

In preferred embodiments, the fax server 10 is a server class machine, such as the AS/400, including a server class operating system, such as OS/400, that is capable of multitasking operations from numerous clients 4a, b, c in order to concurrently manage numerous facsimile transmissions for the clients. Because the conversion computer 20 is dedicated to converting fax e-mail attachments to images in a TIFF file format, the conversion computer 20 need not be as powerful, and hence expensive, as the fax server 10. However, the conversion computer 20 could be used to perform non-fax related operations. Thus, in preferred embodiments, the conversion computer 20 comprises a personal computer with a personal computer operating system, such as Windows NT. However, alternative personal computer operating systems may be used, such as Windows 95/98/2000, IBM OS/2, Linux, etc. Another benefit of using a personal computer system for the conversion computer 20 is that not only are such systems less expensive than server class machines, but such systems are typically more suited for handling the fonts and graphics required for the conversion process than server machines. The personal computer and personal computer oriented operating systems are designed to handle the graphics requirements of common application programs 28a, b, c that will typically be used to create the attachments to the fax e-mail that needs to be converted to a common file format (TIFF) for facsimile transmission.

In alternative embodiments, the conversion computer 20 may be implemented in an expansion card that is plugged into an expansion slot of the fax server 10, such as the IBM Integrated Netfinity Server.** The IBM Integrated Netfinity Server card includes an Intel processor and PC memory, runs Windows NT and is capable of fitting into a PCI or SPD slot in the AS/400 server.

The different components of the network 4a, b, c, 8, 10, and 20 communicate over a network 24 comprised of any network technology known in the art.

Figure 2:
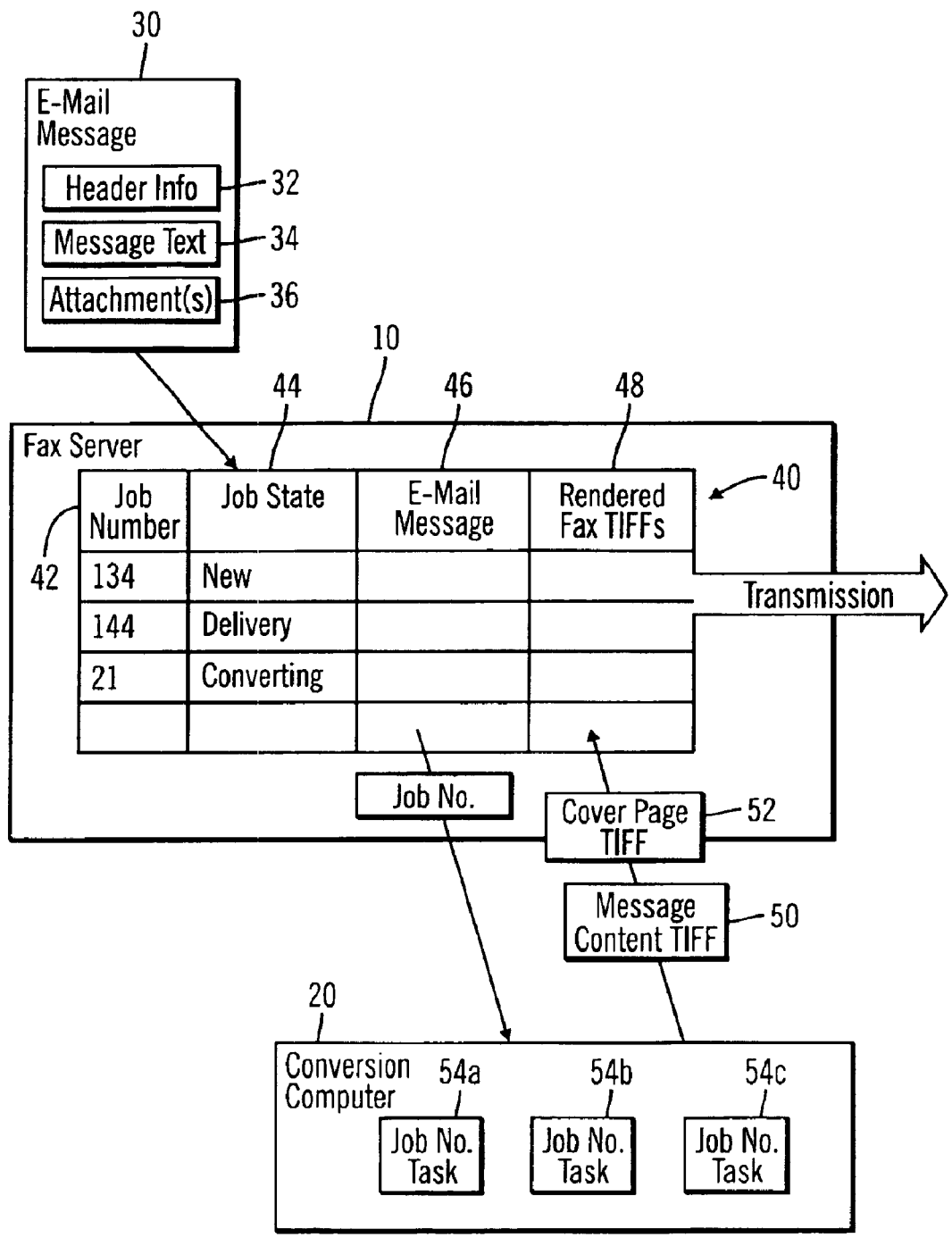
FIG. 2 illustrates a workflow diagram of processing an e-mail to fax in accordance with preferred embodiments of the present invention.

FIG. 2 illustrates a workflow diagram of how a fax e-mail 30 is processed throughout the preferred embodiment fax processing system. The fax e-mail 30 includes a header 32 specifying a recipient, the sender, and a subject line, message text 34 which is the e-mail message and is preferably in a text format, such as the Rich Text Format (RTF), ASCII, etc., and one or more attachments 36, which may have been created with different application programs (e.g., word processor, spreadsheet program, graphics programs, database programs, etc.). The fax e-mail 30, including the header info 32 and message text 34, may alternatively include additional fields of information or less information than shown. To manage the flow of a fax e-mail 30, the fax management software 12 assigns the fax e-mail (fax job), a unique job number, which is used to uniquely identify the fax job as it proceeds through the workflow.

The fax management software 12 maintains a job table 40, which is used to control the workflow of the fax e-mail job. The job table 40 may comprise a database table or any other data structure known in the art. Still further, the table 40 may include more, less or different fields than shown in FIG. 2. The job table 40 includes as a key column the unique job number field 42 of the job; a job state field 44 indicating the current state of the job in the fax workflow; a message field 46 including all the components 32, 34, 36 of the e-mail message 30; and a rendered fax TIFF field 48 including TIFFs files rendered at the conversion computer 20. Thus, the job table 40 provides the core information needed to control the fax workflow. Alternatively, certain of the fields in the job table 40 may be maintained at alternative locations. For instance, the e-mail message field 46 and rendered fax TIFF field 48 may include pointers to storage or memory locations where the actual data, i.e., components 32, 34, and 36 of the e-mail message 30 and rendered TIFF files 50 and 52, respectively, are maintained, instead of the actual files and data.

The job table may include the following states:

New state: the state when the job number is first generated and a fax job entry is created in the job table 40.

Converting state: the state after the job number of a fax job record having the new state is sent to the conversion computer.

Delivery state: the state after the fax management software 12 receives from the conversion computer 20 message text 34, attachment files 36, and any cover page converted into one or more TIFF files.

Transmitting state: the state after the fax management software 12 sends the rendered TIFF files to the modem port 18.

Transmission Status states: these are states following the modem port's 18 transmission, and may indicate completed, retrying, failure, etc.

In alternative embodiments, fewer or more states may be used for the workflow or different naming conventions may be used for the states.

In preferred embodiments, the conversion computer 20 receives the job number and then accesses the job table 40 to obtain the header 32, message text 34 and any attachment files 36 to render into a message content TIFF 50. Using the header info 32, the fax conversion program 26 would access, if available, a separate cover page form for the sender from a cover page database, typically maintained at a server (not shown) elsewhere in the network 24. If there is no cover page for the sender in the cover page database or the sender has not requested the use of a cover page, then the fax would be rendered without a cover page. If a cover page form is provided, the conversion program 26 would render the accessed cover page into a cover page TIFF 52. The conversion computer 20 would send the rendered message content TIFF 50 and a cover page TIFF 52 to the fax server 10. The fax management software 12 would insert the rendered TIFF files 50 and 52 in the rendered fax TIFF field 48 to await the transmission mode.

In preferred embodiments, the message content TIFF 50 includes a first page that includes the e-mail window view, including all the header info 32, message text 34, and graphical representations (e.g., icons) of attachments 36 as is commonly displayed in an e-mail message. Following the e-mail view would be the renderings of any attachments 36.

In preferred embodiments, a separate task or thread is spawned in the conversion computer 20 to process each fax job received from the fax server 10. In this way, the conversion computer 20 may concurrently process each received fax number in separate job number tasks 54a, b, c, as shown in FIG. 2, wherein the components of each job are sequentially processed in each task.

In preferred embodiments, the tasks 54a, b, c execute as separate threads under control of the fax conversion program 26. In this way, the fax job conversion operations are multi-tasked across fax jobs. Still further, multiple threads may be spawned under the fax conversion program 26 to concurrently render different attachments in the same fax job.

Figure 3:
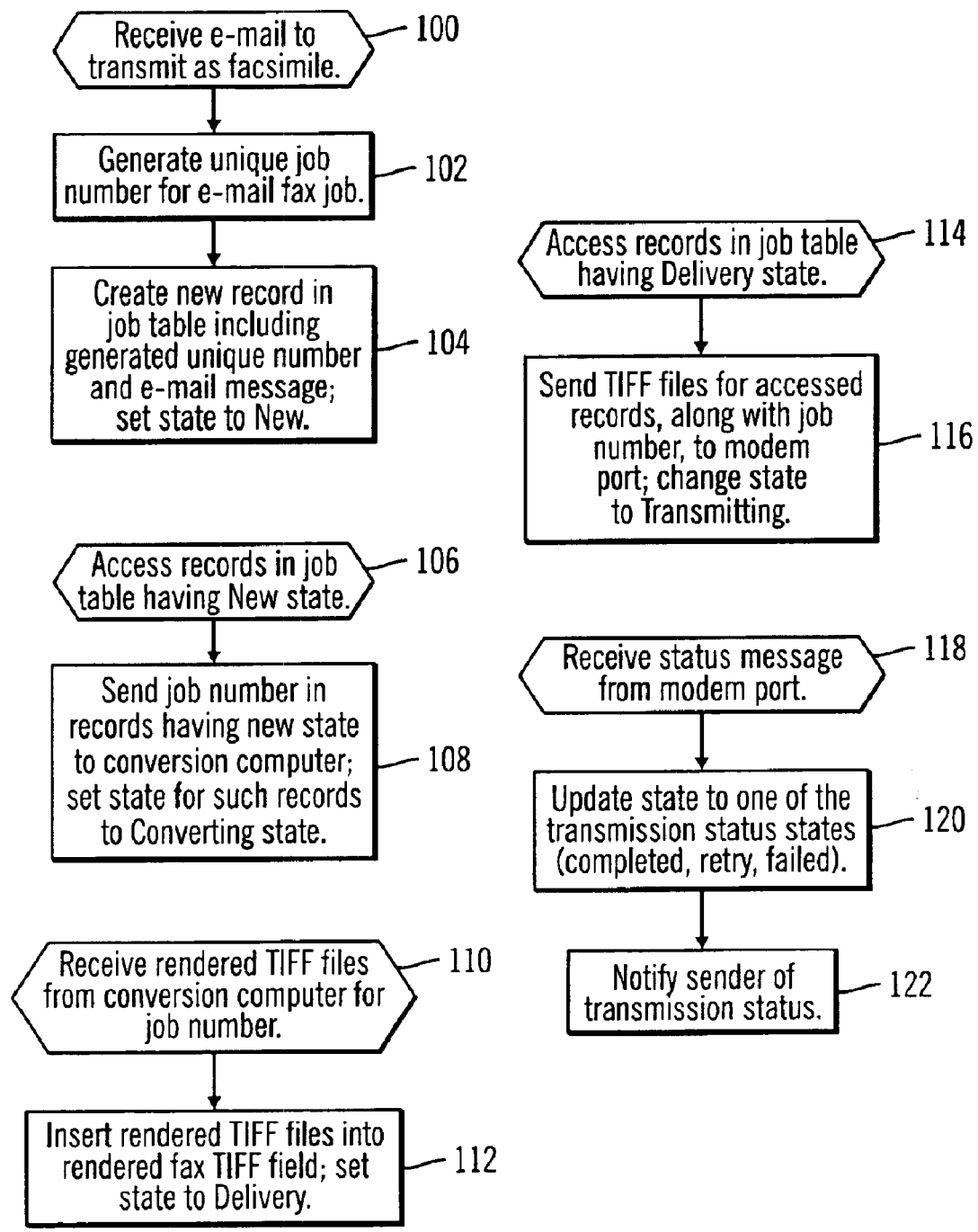
FIG. 3 illustrates logic implemented in a fax server to process an e-mail fax in accordance with preferred embodiments of the present invention.

FIG. 3 illustrates logic implemented in the fax management software 12 to process the workflow of e-mail fax jobs from multiple clients 4a, b, c. At block 100, the fax management software 12 receives a fax e-mail message 30 from one of the clients 4a, b, c via e-mail server 8. The fax management software 12 would then generate (at block 102) a unique job number for the e-mail fax job and create (at block 104) a new record in the job table 40 to include the generated unique number in the job number field 42 and the components 32, 34, and 36 of the received fax e-mail message 30 in the e-mail message field 46. The job state 44 for the new record is set to "New."

At block 106, the fax management software 12 would access records in the job table 40 having the "New" state, send (at block 108) the job number for the accessed records to the conversion computer 20, and set the state to "Converting".

At block 110, the fax management software 12 receives TIFF files for a job number from the conversion computer 20 and then inserts (at block 112) the rendered TIFF file(s), which would include the message content TIFF 50 and, if available, the cover page TIFF 52, into the rendered fax TIFF field 48 of the record for the job number. The state for these updated records is set to "Delivery". As discussed, if the there is no cover page or none is requested, then the fax job would only include the message content TIFF 50.

At block 114, the fax management software 12 accesses records in the job table 40 having the "Delivery" state and sends (at block 116) the TIFF files 50, 52 in the rendered fax TIFF field 48 to the modem port 18 and changes the state for such records to "Transmitting".

At block 118, the fax management software 12 receives a status message from the modem port 18 for a fax job number. The fax management software 12 then updates (at block 120) the state to a possible transmission state, e.g., completed, failed, retrying, etc., and then sends (at block 122) a message to the sender over the network 24 indicating the status of the transmission.

The operations beginning at blocks 100, 106, 110, 114, and 118 may be executed concurrently as separate tasks and operate asynchronously. Because, in preferred embodiments, the fax management software 12 is running in a server class machine, it is capable of multitasking. The operations beginning at: block 110 is triggered in response to a message from the conversion computer 20; block 100 is triggered when the fax management software 12 receives a fax e-mail from the e-mail server 8; and block 118 is triggered in response to a message from the modem port 18. In preferred embodiments, the fax management software 12 may initiate the operations beginning at blocks 106 and 114 at periodic intervals or in response to the state being set to "New" (for block 106) and the state being set to "Delivery" (for block 114). However, alternative techniques may be used to trigger the operations described above and process the records in the job table 40.

Figure 4:
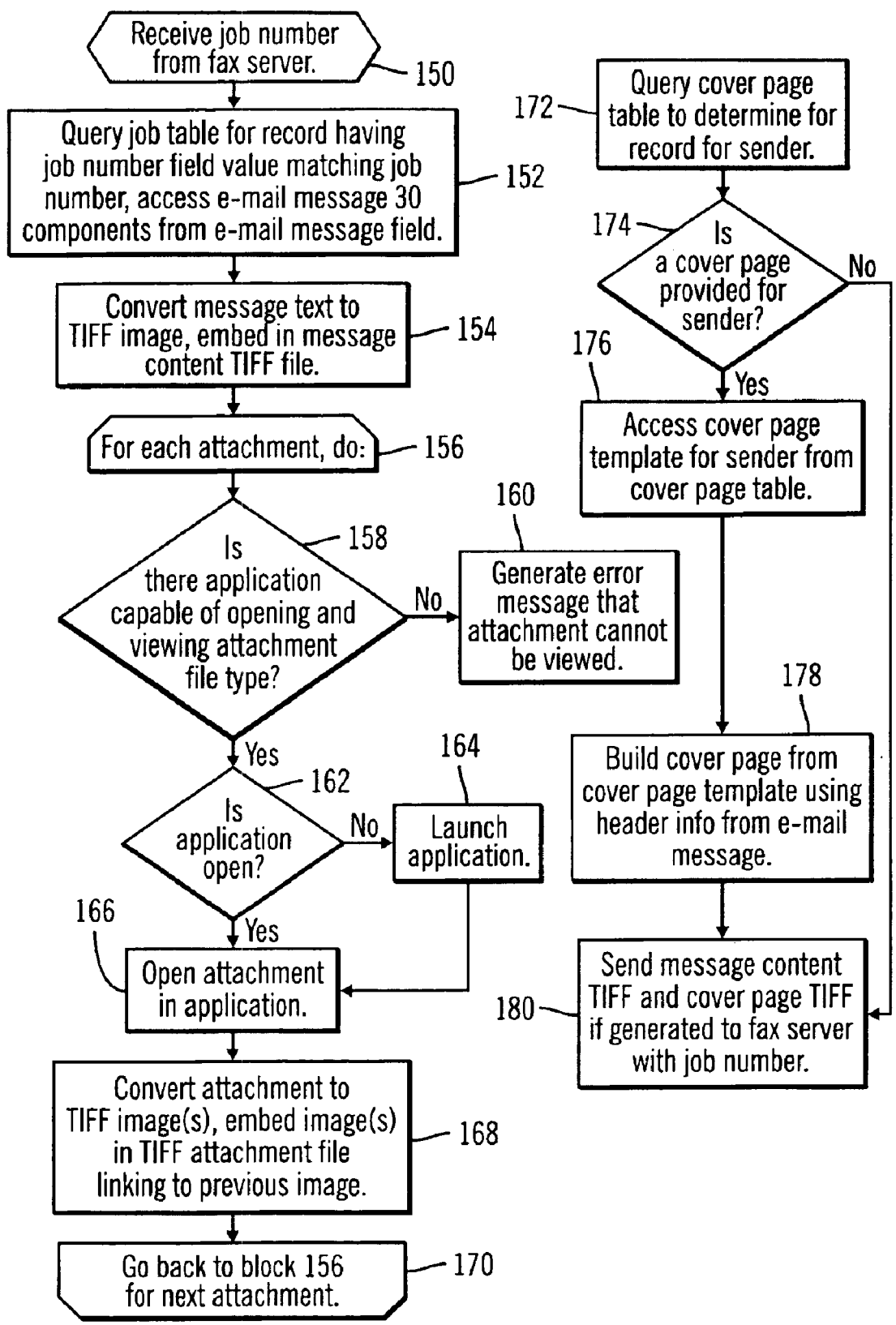
FIG. 4 illustrates logic implemented in a conversion computer to convert attachments to the e-mail fax to a TIFF file in accordance with preferred embodiments of the present invention.

FIG. 4 illustrates logic implemented in the fax conversion program 26 to convert attachments for a fax job into TIFF files 50 and 52. Control begins at block 150 with the fax conversion program 26 receiving a job number from the fax server 10. In preferred embodiments, because the conversion computer 20 is dedicated to fax conversion operations, the fax conversion program 26 may concurrently convert attachments for multiple fax jobs executing in tasks 54a, b, c. The fax conversion program 26 then queries (at block 152) the job table 40 for the record having a job number field value matching the job number and then accesses the components 32, 34, and 36 in the e-mail message field 46 of the accessed record. The fax conversion program 26 then converts (at block 154) the header 32, message text 34, which is in a text format (e.g., ASCII, RTF, etc.), and graphical representations of the attachments 36 into a TIFF image and embeds the image into the message content TIFF file 50.

The fax conversion program 26 then begins a loop at block 156 through 170 to convert each attachment 36 to a TIFF image. The fax conversion program 26 may process a directory or table associating application programs with file types to determine (at block 158) whether there is an installed application program 28a, b, c capable of opening and transforming the attached file. If there is no available application program, then an error message is generated (at block 160), which may cause the facsimile job to fail. Otherwise, if there is an available application program 28a, b, c, the application program 28a, b, c is launched (at block 164) if it is not already open (at block 162). The attached file is then opened (at block 166) in the application program 28a, b, c. The fax conversion program 26 then converts (at block 168) the opened file into one or more TIFF images which are then embedded into the message content TIFF file 50 and linked to any previous image in a manner known in the art.

To generate a cover page, the fax conversion program 26 queries (at block 172) a cover page database table (not shown) to determine if there is a cover page record for the sender. If so (at block 174), the fax conversion program 26 accesses (at block 176) the template for the cover page from the user record in the cover page table and builds (at block 178) a cover page from the accessed template and header info 32. From block 178, the fax conversion program 26 then sends the message content 50 and cover page 52 TIFF files to the fax server 10 with the unique job number to complete the fax job. Otherwise, if there is no cover page to generate for the fax job (from the no branch at block 174), the fax conversion program 26 sends only the message content TIFF file 50 to the fax server 10.

In further embodiments, the fax conversion program 26 may include logic to manage the number of application programs 28a, b, c open at any given time to conserve system resources. For instance, a timer may be used. In such case, if an application program remains open for a certain period of time without being used to open and convert an attachment file, then the fax conversion program 26 may close the application program 28a, b, c to conserve system resources. However, those application programs 28a, b, c that are more frequently used will remain open to avoid having to continually close and open an application program 28a, b, c, which also consumes substantial system resources.

Still further, to optimize conversion processing time, the fax conversion program 26 may use a single application program 28a, b, c to concurrently convert multiple attachment files associated with the application program 28a, b, c to TIFF images. If the application program 28a, b, c allows for multi-threading or tasking, then a single instance of the application program 28a, b, c can concurrently convert multiple attachment files to TIFF images. Otherwise, multiple instances of the application program 28a, b, c may be opened to concurrently convert multiple attachment files to TIFF images. Yet further, because the conversion computer 20 is dedicated to rendering and conversion operations, it may concurrently process attachment files from different fax jobs to concurrently convert the attachment files from different fax jobs to TIFF images. Thus, with the preferred embodiment architecture, the fax server 10 may concurrently process fax jobs and the conversion computer 20 may concurrently convert attachment files to TIFF images so all aspects of different fax jobs are processed in parallel.

The preferred embodiment network facsimile architecture and workflow provides improvements over prior art network fax server technologies because the fax server 10 is relieved of performing the rendering and conversion operations, which in prior art systems requires substantial fax server resources, thus requiring additional fax server machines to maintain system performance. With the preferred embodiments, the rendering and conversion process is transferred to a dedicated personal computer class system that is especially suited for handling the conversion operations, such as a personal computer including a personal computer operating system and graphics engine, such as a graphics card. Most attachments are typically created using personal computer application programs, such as word processors, graphics programs, spreadsheets, etc., that are graphics intensive. A dedicated personal computer class system can more efficiently and effectively handle the conversion operations than a server class machine because typically the application programs used to create the attachments are designed to run on a personal computer machine including a graphics card and PC operating system, e.g., Microsoft Windows 98, NT, IBM O/S2, etc.

The preferred architecture is also advantageous because a personal computer class machine is typically substantially less expensive than a server class machine such as the IBM AS/400. The use of a dedicated personal computer class machine in the fax workflow environment reduces processing burdens on the fax server by transferring the conversion and rendering operations to one or more dedicated personal computer machines which are both less expensive and more suited for rendering and conversion operations than the fax server. By conserving fax server computing resources, fewer fax servers are needed in the network as the fax servers may now focus exclusively on fax job management operations, which is what server class machines are most suited for— managing multiple jobs in a workflow environment. Thus, fax server resources are relieved from performing rendering and conversion operations with less expensive personal computing resources that can perform the rendering and conversion operations more efficiently than the fax server.

USING MULTIPLE FAX SERVERS WITH A SINGLE CONVERSION COMPUTER

Figure 5:
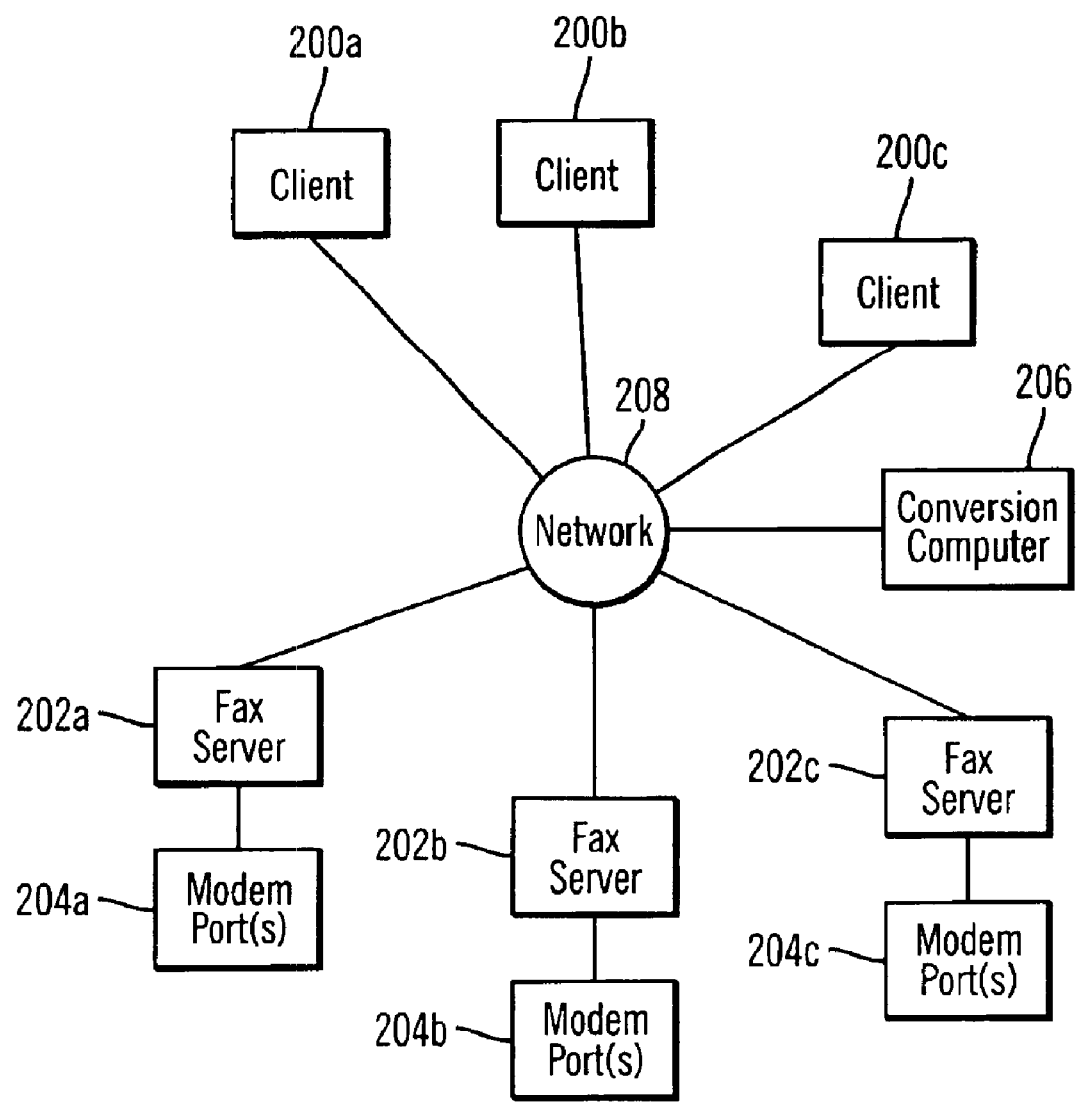
FIG. 5 is a block diagram illustrating a computing environment in which multiple fax servers use a single conversion computer to perform fax job rendering operations in accordance with preferred embodiments of the present invention.

FIG. 5 Illustrates a further embodiment where multiple fax servers off-load their fax conversion operations to a single conversion computer. Clients 200a, b, c can communicate fax e-mail messages 30 to one of many fax servers 202a, b, c through the network 208. The fax servers 202a, b, c would then off-load their conversion operations to the conversion computer 206 in the manner described above.

The conversion computer 206 would then return a rendered fax job, including the message content 50 and cover page 52 TIFFs, to the fax server 202a, b, c that provided the job number for the TIFF files 50, 52 generated. The fax servers 202a, b, c would then transmit the TIFF files 50, 52 to the recipient via their respective modem ports 204a, b, c. The clients 200a, b, c fax servers 200a, b, c, and conversion computer 206 would have the same hardware and software components as the clients 4a, b, c, fax server 10, and conversion computer 20, respectively, described with respect to FIG. 1.

In preferred embodiments, there may be a fax administrator computer (not shown) that routes fax jobs to a particular fax server 202a, b, c to balance the workload across the fax servers 200a, b, c. Still further, one fax server 10 system, such as an IBM AS/400 system, may run multiple instances of the fax management software 12, thus appearing as multiple fax servers.

Each fax server 202a, b, c would maintain its own job table to manage those fax e-mails routed to the fax server 200a, b, c. When receiving job numbers from the fax servers 200a, b, c, the conversion computer 206 would maintain the network address of the sending fax server 200a, b, c. The conversion computer 206 would use the fax server 202a, b, c network address when accessing the job table to ensure that it accesses the job table of the fax server 202a, b, c that sent the job number. The fax server 202a, b, c network address is also used in order to ensure that the converted message content 50 and cover page 52 TIFFs is sent back to the originating fax server 202a, b, c.

The conversion computer 206, which in preferred embodiments is especially suited for graphics rendering operations, is optimally suited for multi-tasking rendering operations for multiple fax servers 202a, b, c because it is only performing rendering operations and not distracted with non-rendering operations, as is the case with prior art fax servers that perform both rendering and fax transmission operations. The conversion computer 206 would initiate a thread or begin a separate task for each job number received from the fax servers 200a, b, c. This preferred embodiment arrangement is an improvement over the current art where a single computer, such as a Windows NT workstation, performs both rendering and fax transmitting for multiple clients. Such prior art systems do not allow for as many concurrent rendering operations as the preferred embodiment conversion computer 206 because in such prior art systems the facsimile operations significantly consume system resources thereby limiting the number of concurrent rendering operations the system can handle.

With the preferred embodiment architecture, each device is handling the operations it is most suited for. The conversion computer 206 is dedicated to conversion and rendering operations, and thus can provide rendering for multiple fax servers 200a, b, c. This arrangement is particularly advantageous because not only can the conversion computer 206 process rendering operations more efficiently than the fax servers 202a, b, c (as the conversion computer 206 is preferably a personal computer class machine more suited for executing the application programs 28a, b, c than the server systems), but its processing cost is less expensive than the fax severs 200a, b, c, which are server class machines. Further, the fax servers 202a, b, c are more suited for fax management operations and multi-tasking the management of multiple fax jobs. Thus, the workload is distributed to the system best suited for handling a particular operation, i.e., the fax servers 202a, b, c perform the fax management and transmission operations and the conversion computer 206, which is preferably a personal computer class machine, performs the rendering operations using common personal computer application programs 28a, b, c (FIG. 1).

Still further, because each fax server 202a, b, c has a modem port 204a, b, c, multiple fax jobs may be transmitted concurrently. Each modem port 204a, b, c may have one or more modem ports. This is an improvement over prior art fax servers where the fax server handles fax transmissions as well as rendering operations, because such prior art fax servers can only transmit one facsimile at a time, thus providing a bottleneck in the fax transmission process. Further, this bottleneck of fax transmissions in the prior art fax servers further degrades the performance of rendering operations, providing a still further bottleneck in the processing of fax jobs.

Another advantage of the preferred embodiments where one conversion computer 206 is used by multiple fax servers 200a, b, c, is that the number of conversion computers 206 in the system is minimized because the resources of the conversion computers 206 are utilized to the maximum extent possible by the multiple fax servers 200a, b, c. This reduces overall cost by both optimizing the use of the conversion computer resources and reducing the number of conversion computers used in the system. This an improvement over prior art systems that attach a single Windows NT box to a single fax server to perform both rendering and faxing. Such prior art systems would not optimally utilize the conversion capabilities of the Windows NT box because only one fax server is using the Windows NT box and significant resources are devoted to managing the fax transmission operations. In preferred embodiments, fax transmissions are handled by the fax servers, thereby allowing the conversion computer to focus on conversion and rendering operations.

The preferred configuration is also advantageous because fewer configuration operations are needed as one rendering computer is used by multiple fax servers. The prior art would utilize a separate Windows NT box for each fax server, thereby requiring multiple configuration operations for the multiple NT boxes. With the preferred implementation fewer rendering computers are used because multiple fax servers share a single rendering computer.

CONCLUSION

This concludes the description of the preferred embodiments of the invention. The following describes some alternative embodiments for accomplishing the present invention.

The preferred embodiments may be implemented as a method, apparatus or signal bearing media using standard programming and/or engineering techniques to produce software, firmware, hardware, or any combination thereof. The programs defining the functions of the preferred embodiment can be delivered to a computer via a variety of signal-bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

Preferred embodiments described certain of the tables and fax processing operations performed in the fax server 10 and the conversion computer 20. However, certain of the operations described as performed with respect to the fax server 10 may be performed in the conversion computer 20 and vice versa.

In preferred embodiments, the e-mail server 8 was described as implemented in a separate machine from the fax server 10. In alternative embodiments, the e-mail, fax and other server related management and routing operations may be performed in a single server machine or across multiple server machines, depending on the processing needs of the network.

In preferred embodiments, the message from the client including the fax job was transmitted as an e-mail message. However, in alternative embodiments, alternative network messaging formats may be used to communicate fax jobs from the clients to the fax server.

In preferred embodiments, the cover page and attachments were converted to images in the TIFF file image format. However, in alternative embodiments, the cover page, message and/or attachments may be converted to an image in a different file format than TIFF that is compatible with the facsimile image transmissions capabilities. Moreover, all images in the fax job may be embedded in a single TIFF file or dispersed throughout any number of TIFF files.

In summary, preferred embodiments disclose a system, method, and program for processing a message in a network computing system including a facsimile transmission comprised of a recipient contact address, e.g., telephone number, e-mail address, etc., and message content. The message content includes at least one of message text and attached files. Multiple facsimile transmissions are managed as fax jobs in multiple fax management systems. The fax management systems transfer the message content from the fax jobs to one rendering computer. The rendering computer launches at least one application program to convert the message content from the multiple fax jobs to images in a file format and transfers each converted message content in the file format to the fax management system that sent the message content to the rendering computing system. The fax management systems transfer the message content in the file format to one of multiple communication ports for transmittal to the recipient contact address.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a message in a network computing system including a facsimile transmission comprised of a recipient contact address and message content, wherein the message content includes at least one of message text and attached files, comprising:

managing multiple facsimile transmission as fax jobs in multiple fax management systems;

transferring the message content from the multiple fax management systems to a rendering computer;

launching, with the rendering computer, at least one application program to convert the message content from the multiple fax jobs to images in a file format;

transferring, with the rendering computer, the converted message content in the file format to the fax management system that sent the message content to the rendering computer;

transferring, with the fax management systems, the message content in the file format to one of multiple communication ports for transmittal to the recipient contact address;

transferring, with the fax management servers, job numbers assigned to the fax jobs to the rendering computer;

requesting, with the rendering computer, the message content for the job numbers, wherein the fax management servers transfer the message content in response to receiving the request from the rendering computer;

maintaining, with the fax management servers, job tables including fax job records identified by job number; and changing, with the fax management servers, state fields in the fax job records to manage the workflow of the fax jobs between the fax management system, the rendering computer, and communication port.

2. The method of claim 1, wherein the message including the facsimile transmission further includes sender information for the sender of the fax job, wherein the rendering computer generates the content of each attachment and message text into images in the file format, further comprising:

using the sender information to access fax cover page information for the fax jobs;

generating a cover page image in the file format from the fax cover page information if there is fax cover page information for the sender of the fax job; and transmitting the converted fax cover page image to the fax management computer that sent the job number.

3. The method of claim 1, wherein the file format comprises an image file format, and wherein the message content is converted to one or more images in the file format.

4. The method of claim 1, wherein for each attachment file received from the fax management computers, the rendering computer further performs:

determining one of multiple application programs capable of opening the attachment file; and using the determined application program to convert the content of the attachment file to one or more images in the file format, wherein all the images in the file format comprising the at least one converted attachment file are transferred to the first computing system.

5. The method of claim 4, further comprising converting, with the rendering computer, the message text to at least one image in the file format, wherein the images comprising the converted attachment files are arranged in a file in the file format according to an order in which they were attached to the message and follow one image comprising the converted message text.

6. The method of claim 4, further comprising maintaining, with the rendering computer, multiple application programs open to concurrently convert the content of different attachment files for fax jobs from multiple fax management computers to images in the file format.

7. The method of claim 4, further comprising using, with the rendering computer, one application program to concurrently convert the content of different attachment files associated with the application program to images in the file format.

8. A network computing system for processing a message in a network computing system including a facsimile transmission comprised of a recipient contact address and message content, wherein the message content includes at least one of message text and attached files in a network computing system, comprising:

(a) a plurality of fax management systems, each comprising a processor and a memory coupled to the processor;

(b) a rendering computer comprising a processor and a memory coupled to the processor;

(c) at least one communication port in communication with each fax management system;

(d) fax management program logic residing in the memory of each fax management system, wherein the fax management logic, when read and executed by the fax management processors, performs:

(i) managing multiple facsimile transmission as fax jobs in multiple fax management systems;

(ii) transferring the message content from the multiple fax management systems to the rendering computer; and (iii) transferring the message content in the file format received from the rendering computer to one communication port for transmittal to the recipient contact address;

(iv) transferring job numbers assigned to the fax jobs to the rendering computer;

(v) maintaining job tables including fax job records identified by job number; and (vi) changing state fields in the fax job records to manage the workflow of the fax jobs between the fax management system, the rendering computer, and communication port; and (e) rendering program logic residing in the rendering memory, wherein the rendering program logic, when read and executed by the rendering computer processor, performs:

(i) launching at least one application program to convert the message content from the multiple fax jobs to images in a file format;

(ii) transferring the converted message content in the file format to the fax management system that sent the message content to the rendering computer; and (iii) requesting the message content for the job numbers, wherein the fax management servers transfer the message content in response to receiving the request from the rendering computer.

9. The network computing system of claim 8, wherein the message including the facsimile transmission further includes sender information for the sender of the fax job, wherein the rendering program logic generates the content of each attachment and message text into images in the file format, and wherein the rendering program logic further performs:

using the sender information to access fax cover page information for the fax jobs;

generating a cover page image in the file format from the fax cover page information if there is fax cover page information for the sender of the fax job; and transmitting the converted fax cover page image to the fax management computer that sent the job number.

10. The network computing system of claim 8, wherein the file format comprises an image file format, and wherein the message content is converted to one or more images in the file format.

11. The network computing system of claim 8, wherein for each attachment file received from the fax management computers, wherein the rendering program logic further performs:

determining one of multiple application programs capable of opening the attachment file; and using the determined application program to convert the content of the attachment file to one or more images in the file format, wherein all the images in the file format comprising the at least one converted attachment file are transferred to the first computing system.

12. The network computing system of claim 11, wherein the rendering program logic further performs converting the message text to at least one image in the file format, wherein the images comprising the converted attachment files are arranged in a file in the file format according to an order in which they were attached to the message and follow one image comprising the converted message text.

13. The network computing system of claim 11, wherein the rendering program logic further performs maintaining multiple application programs open to concurrently convert the content of different attachment files for fax jobs from multiple fax management computers to images in the file format.

14. The network computing system of claim 11, wherein the rendering program logic further performs using one application program to concurrently convert the content of different attachment files associated with the application program to images in the file format.

15. A signal-bearing medium containing a fax management program and rendering program for processing a message in a network computing system including a facsimile transmission comprised of a recipient contact address and message content, wherein the message content includes at least one of message text and attached files, wherein the fax management program is executed by multiple fax management computers and the rendering program is executed by a rendering computer to perform:

wherein the fax management program is capable of causing the fax management computers to perform:

(i) managing multiple facsimile transmission as fax jobs in multiple fax management systems;

(ii) transferring the message content to the rendering computer;

(iii) transferring the message content in the file format to one of multiple communication ports for transmittal to the recipient contact address;

(iv) transferring job numbers assigned to the fax jobs to the rendering computer;

(v) maintaining job tables including fax job records identified by job number; and (vi) changing state fields in the fax job records to manage the workflow of the fax jobs between the fax management system, rendering computer, and communication port; and wherein the rendering program is capable of causing the rendering computer to perform:

launching at least one application program to convert the message content from the multiple fax jobs to images in a file format;

transferring the converted message content in the file format to the fax management system that sent the message content to the rendering computer; and requesting the message content for the job numbers, wherein the fax management servers transfer the message content in response to receiving the request from the rendering computer changing state fields in the fax job records to manage the workflow of the fax jobs between the fax management system, rendering computer, and communication port.

16. The signal bearing medium of claim 15, wherein the message including the facsimile transmission further includes sender information for the sender of the fax job, wherein the rendering program generates the content of each attachment and message text into images in the file format, and wherein the rendering program further performs:

using the sender information to access fax cover page information for the fax jobs;

generating a cover page image in the file format from the fax cover page information if there is fax cover page information for the sender of the fax job; and transmitting the converted fax cover page image to the fax management computer that sent the job number.

17. The signal bearing medium of claim 15, wherein the file format comprises an image file format, and wherein the message content is converted to one or more images in the file format.

18. The signal bearing medium of claim 15, wherein for each attachment file received from the fax management computers, the rendering program further performs:

determining one of multiple application programs capable of opening the attachment file; and using the determined application program to convert the content of the attachment file to one or more images in the file format, wherein all the images in the file format comprising the at least one converted attachment file are transferred to the first computing system.

19. The signal bearing medium of claim 18, wherein the rendering program further performs converting the message text to at least one image in the file format, wherein the images comprising the converted attachment files are arranged in a file in the file format according to an order in which they were attached to the message and follow one image comprising the converted message text.

20. The signal bearing medium of claim 18, wherein the rendering program further performs maintaining multiple application programs open to concurrently convert the content of different attachment files for fax jobs from multiple fax management computers to images in the file format.

21. The signal bearing medium of claim 18, wherein the rendering program further performs using one application program to concurrently convert the content of different attachment files associated with the application program to images in the file format.

* * * * *

UNITED STATES PATENT AND TRADEMARK OFFICE
CERTIFICATE OF CORRECTION

PATENT NO.    : 6,914,693 B1
DATED         : July 5, 2005
INVENTOR(S)   : Kevin Wayne Kirkeby It is certified that error appears in the above-identified patent and that said Letters Patent is hereby corrected as shown below:

Column 15,
Lines 3-5, please delete the following "changing state fields in the fax job records to manage the workflow of the fax jobs between the fax management system, rendering computer, and communication port."

Signed and Sealed this

Twenty-second Day of November, 2005

JON W. DUDAS
*Director of the United States Patent and Trademark Office*